United States Patent

Watkins

[15] 3,640,819
[45] Feb. 8, 1972

[54] INHIBITING LPG PRODUCTION IN A HYDROCRACKING PROCESS

[72] Inventor: Charles H. Watkins, Arlington Heights, Ill.
[73] Assignee: Universal Oil Products Company, Des Plaines, Ill.
[22] Filed: June 12, 1969
[21] Appl. No.: 832,839

[52] U.S. Cl..............................208/111, 252/455 Z, 252/459
[51] Int. Cl. .....................................C10g 13/02, B01j 11/40
[58] Field of Search..........................252/455 R, 455 Z, 459; 208/111, DIG. 2

[56] References Cited

UNITED STATES PATENTS

| | | | |
|---|---|---|---|
| 2,926,130 | 2/1960 | Hogan | 208/111 X |
| 3,139,398 | 6/1964 | Bray et al. | 208/111 X |
| 3,331,767 | 7/1967 | Arey, Jr. et al. | 208/111 |
| 3,437,586 | 4/1969 | Weisz | 208/110 |
| 3,507,812 | 4/1970 | Smith et al. | 252/455 Z |

Primary Examiner—C. F. Dees
Attorney—James R. Hoatson, Jr. and Robert W. Erickson

[57] ABSTRACT

A catalystic composite of a porous carrier material, a nickel component and a metal component selected from Groups I, II or V of the Periodic Table. When utilized in a hydrocracking process, to produce lower-boiling hydrocarbon products, for example gasoline boiling range hydrocarbons, the catalyst effectively inhibits excessive formation of liquefied petroleum gas of the propane/butane type, as well as lighter gaseous hydrocarbons. A preferred catalytic composite comprises a crystalline aluminosilicate, from about 0.1 percent to about 10.0 percent by weight of nickel and from about 0.01 percent to about 2.0 percent by weight of a metallic component selected from vanadium, lithium, beryllium or barium.

5 Claims, No Drawings

INHIBITING LPG PRODUCTION IN A HYDROCRACKING PROCESS

APPLICABILITY OF INVENTION

The present invention is directed toward the conversion of hydrocarbon charge stocks into lower-boiling hydrocarbon products. My invention also encompasses a novel catalytic composite having exceptional activity, selectivity and stability when utilized in a hydrocracking process. The catalyst utilized in the process of the present invention can, in general, be categorized as a dual-function catalyst having both hydrogenation and cracking activity. However, as hereinafter indicated, the cracking activity of the catalyst of the present invention is advantageously less than that of currently utilized catalysts, especially when producing lower-boiling hydrocarbon products in the gasoline boiling range.

Catalytic composites having a hydrogenation function and a cracking function enjoy widespread use in many industries. Generally, the cracking function is thought to be associated with an acid-acting material of the porous, adsorptive refractory oxide type utilized as the carrier material for one or more metallic components from the metals of Groups V through VIII of the Periodic Table. These catalytic composites are generally employed to promote a wide variety of hydrocarbon conversion reactions including hydrocracking, hydrogenation, desulfurization, alkylation and transalkylation, cracking, ring-opening (a form of cracking), hydroisomerization, etc. In many cases, the commercial application resides in a process where more than one of these reactions proceed simultaneously. For example, in a hydrocracking process, to which the present invention is specifically directed, catalysts of this type are utilized to effect the hydrogenative cracking of high molecular weight materials to produce a substantially saturated, lower-boiling, normally liquid, or normally gaseous (LPG) product effluent. The catalyst, for use in the present process, as hereinafter described, constitutes a composite of a porous carrier material, from about 0.1 percent to about 10.0 percent by weight of a nickel component and from about 0.01 percent to about 2.0 percent by weight of a component selected from the group consisting of the metals of Groups I, II and V of the Periodic Table, all of which are calculated as if existing as the elements. It is surprising to note that the cracking activity of the catalyst, which may be defined as the conversion of hydrocarbons boiling above a given temperature into normally liquid hydrocarbons, boiling below a given temperature, is not impaired. Significantly, however, both the hydrogenation activity and cracking activity are inhibited to the extent that lesser quantities of LPG of the propane/butane type are produced, and there exists a noticeable increase in the aromatic hydrocarbon retention within the normally liquid product effluent.

Suitable charge stocks include kerosene fractions, boiling in the range of about 300° F. to about 600° F.; light gas oils, boiling in the range of about 500° F. to about 750° F.; heavy gas oils boiling up to a temperature of about 950° F.; and, various overlapping fractions and boiling ranges thereof. With some modification, the fresh feed charge stock may even contain hydrocarbons boiling up to a temperature of about 1,050° F., or even higher. With the heavier charge stocks, boiling above the light gas oil boiling range, a preferred catalytic composite contains from 5.0 to 10.0 percent by weight of nickel. With lower-boiling charge stocks, lower quantities of the nickel component may be employed, in the range of about 0.1 percent to about 5.0 percent by weight. The extent to which hydrocracking is effected is dependent upon the ultimately desired product—i.e., whether motor fuel gasoline, kerosene, middle-distillates, etc., or a product slate comprising various combinations thereof.

The process and catalysts of the present invention is especially advantageous for the production of gasoline boiling range hydrocarbons from light and heavy gas oil charge stocks. Most of the charge stocks, intended for hydrocracking, are contaminated by sulfurous compounds and nitrogenous compounds, and, in the case of the heavier charge stocks, metallic contaminants, insoluble asphalts, etc. It is well known that contaminated charge stocks are generally hydrotreated, or hydrorefined, in order to prepare a feed stock suitable for hydrocracking. Thus, the process encompassed by the present invention can be beneficially utilized as a second stage of a two-stage process, in the first stage of which the fresh feed is hydrorefined. It will be presumed that the various feed stocks herein discussed have been subjected to a prior cleanup operation before being charged to the hydrocracking process encompassed by my invention, notwithstanding that the cleanup operation and the hydrocracking operation may be conducted in a series-flow fashion.

Heretofore, hydrocarbon feed stocks have been subjected to hydrocracking in contact with catalytic composites containing from about 1.0 percent to about 10.0 percent of a nickel component, and more often the intermediate range of about 4.0 percent to about 7.0 percent. Many processes favor the utilization of a Group VIII noble metal component, particularly platinum and/or palladium, which component may be utilized in the lower concentration in the range of about 0.1 percent to about 2.0 percent by weight. However, the extremely high cost and relatively short supply of the Group VIII noble metals do not make their use economically attractive where other metal components are found to be suitable. Regardless of the metal components, the catalyst in current use generally consists of the metallic components and a relatively highly siliceous carrier material. The silica-containing carrier material is taught to be of the amorphous inorganic oxide type, or of the crystalline aluminosilicate type. The major drawback inherent in the use of such prior art catalysts resides in the overproduction of LPG of the propane/butane type where the intended object resides in maximum quantities of gasoline boiling range hydrocarbons.

OBJECTS AND EMBODIMENTS

One object of the present invention is to provide a hydrocarbon conversion catalyst having superior performance characteristics when utilized in a hydrocracking process. A corollary objective resides in providing a catalytic composite which results in significantly lesser quantities of LPG, while producing maximum quantities of a normally liquid product effluent.

Another object resides in a novel hydrocracking catalyst comprising a nickel component, a crystalline aluminosilicate and a metallic component from Groups I, II or V of the Periodic Table.

In one embodiment, my invention relates to a process for converting a hydrocarbon charge stock into lower-boiling, normally liquid hydrocarbon products which comprises reacting said charge stock and hydrogen at hydrocracking conditions, in a hydrocracking reaction zone and in contact therein with a catalytic composite of a porous carrier material, a nickel component and at least one metallic component selected from the group consisting of the metals of Groups I, II and V of the Periodic Table. In another embodiment, the hydrocracking conditions include a maximum catalyst temperature of from 600° F. to about 900° F., a pressure of from 1,000 to about 5,000 p.s.i.g., a hydrogen concentration of from 2,000 to about 50,000 s.c.f./Bbl. and an LHSV (liquid hourly space velocity) of from about 0.25 to about 10.0.

Another embodiment of my invention affords a hydrocracking catalyst which comprises a faujasitic crystalline aluminosilicate carrier material, at least about 90.0 percent by weight of which is zeolitic, from about 0.1 percent to about 10.0 percent by weight of a nickel component and from about 0.01 percent to about 2.0 percent by weight of a metallic component selected from the group consisting of the metals of Groups I, II and V of the Periodic Table.

Other objects and embodiments of my invention relate to specifics regarding preferred catalyst ingredients, concentration of components within the catalyst, methods of catalyst preparation, operating conditions for use in the hydrocracking process, and other like particulars which are hereinafter given in the following detailed discussion.

SUMMARY OF INVENTION

The operating conditions, under which the process is conducted, will generally vary according to the physical and chemical characteristics of the charge stock, the desired end result and the particular catalytic composite. The heavier charge stocks, being those containing a considerable quantity of hydrocarbons boiling above a temperature of about 750° F., require a high severity of operation inclu;ing higher pressures and catalyst bed temperatures, relatively lower liquid hourly space velocities and high hydrogen circulation rates. Obviously, a low severity operation is employed with the comparatively lighter feed stocks. In accordance with the present invention, the conversion conditions include an LHSV of from about 0.25 to about 10.0, a hydrogen circulation rate of about 2,000 to about 50,000 s.c.f./Bbl., a pressure of from 1,000 to about 5,000 p.s.i.g. and a maximum catalyst bed temperature of from 600° F. to about 900° F. Preferred ranges, particularly when processing the lighter hydrocarbon feed stocks hereinabove described, are an LHSV of about 0.5 to about 5.0, a hydrogen circulation rate of about 3,000 to about 20,000 s.c.f./Bbl., a pressure of from about 1,000 to about 3,000 p.s.i.g., and a maximum catalyst bed temperature below about 850° F.

As hereinbefore set forth, the process of the present invention utilizes a particular catalytic composite, and, in one embodiment, provides for a novel catalytic composite. This catalyst constitutes a porous carrier material having combined therewith a nickel component and a metal component from Groups I, II or V of the Periodic Table. Considering first the porous carrier material, it is preferred that it be adsorptive and possess a high surface area of about 25 to about 500 square meters per gram. Suitable carrier materials are selected from the group of amorphous refractory inorganic oxides including alumina, titania, zirconia, thoria, boria, silica-alumina, alumina-boria, alumina-silica-boron phosphate, silica-zirconia, etc. When of the amorphous type, the preferred carrier material is a composite of alumina and silica, with silica being present in an amount of about 10.0 percent to about 90.0 percent by weight.

The novel catalytic composite encompassed by my invention involves the use of a carrier material of a crystalline aluminosilicate, often referred to in the art as molecular sieves. These include mordenite, faujasite, Type A or Type U molecular sieves, etc., with the preferred crystalline aluminosilicate being faujasite. When utilized, the zeolitic carrier material may be in the hydrogen form, or in a form which has been treated with multivalent cations.

Suitable amorphous carrier materials have an apparent bulk density of about 0.30 to about 0.70 g./cc., and surface area characteristics indicating a pore diameter of about 20 to about 300 Angstroms, a pore volume of about 0.10 to about 1.0 milliliters per gram and a surface area of about 100 to about 500 square meters per gram. The carrier material may be prepared by any of the suitable means thoroughly described in the art, and may be activated prior to use by one or more treatments including drying, calcination, steaming, etc. For example, the amorphous carrier may be prepared by adding a suitable alkaline reagent, such as ammonium hydroxide, to a salt of aluminum, silicon, etc., including aluminum chloride, aluminum nitrate, sodium silicate, etc., in an amount to form an hydroxide gel which, upon drying and calcination is converted into the inorganic oxide. The formed inorganic oxide may then be fabricated into any desired shape including spheres, pills, cakes, extrudates, powders, granules, etc., and may further be utilized in any desired size.

When a crystalline aluminosilicate, or zeolitic material, is intended for use as the carrier, it may be prepared in a number of ways. However, one method is especially preferred when the carrier material is intended to be substantially pure crystalline aluminosilicate particles. In employing the term "substantially pure," the intended connotation is an aggregate particle at least 90.0 percent by weight of which is zeolitic. Thus, the zeolitic carrier is distinguished from an amorphous carrier, or prior art pills and/or extrudates, in which the zeolitic material might be dispersed within an amorphous matrix with the result that only about 40.0 percent to about 70.0 percent by weight of the final particle is zeolitic. This preferred method also produces crystalline aluminosilicate particles of the faujasite modification, and utilizes aqueous solutions of colloidal silica and sodium aluminate. The solutions of sodium silicate, or colloidal silica, and sodium aluminate are intimately commingled and allowed to react to form solid crystalline aluminosilicate particles. After the solid crystalline aluminosilicate has been formed, the mother liquor is separated from the solids by methods including decantation or filtration. The solids are water washed and filtered to remove undesirable ions, and to reduce the quantity of amorphous material, and are subsequently reslurried in water to a solids concentration of about 5.0 percent to about 50.0 percent by weight. The cake and the water are violently agitated and homogenized until the agglomerates are broken and the solids are uniformly dispersed in what appears to be a colloidal suspension. The suspension is then spray dried by conventional means such as pressuring the suspension through an orifice into a hot, dry chamber. The solid particles are withdrawn from the drying chamber and are suitable for forming into finished particles of the desired size and shape. The preferred form of the finished particle is a cylindrical pill, and these may be prepared by introducing the spray-dried particles directly into a pilling machine without the addition of an extraneous lubricant or binder. The pilling machines are adjusted to produce particles having a crushing strength of from 5 to about 15 pounds. The pilled faujasitic carrier material, of which at least about 90.0 percent by weight is zeolitic, is activated catalytically by converting the sodium form either to the divalent form, the hydrogen form, or mixtures thereof. As previously indicated, the catalyst for use in the process of the present invention contains a nickel component in combination with one or more metallic components selected from the group consisting of the metals of Groups I, II, and V of the Periodic Table. Particularly preferred catalytic composites contain from about 0.1 percent to about 10.0 percent by weight of nickel and from about 0.01 percent to about 2.0 percent by weight of one or more metal components from Groups I, II or V. With respect to Groups I, II and V of the Periodic Table, it is intended to include those metals set forth in the *Periodic Table of The Elements*, E. H. Sargent & Co., 1964. Thus, in addition to the nickel component, the preferred catalyst will comprise one or more metal components selected from the groups consisting of lithium, sodium, potassium, rubidium, beryllium, magnesium, calcium, strontium, barium, vanadium, niobium and tantalum. It is understood that these metal components may exist within the composite in some combined form (oxide, sulfide, etc.), or in the elemental state. Regardless, the concentrations are computed on the basis of the elemental metals.

With respect to the nickel component, it may be incorporated into the carrier material in any suitable manner including coprecipitation or cogellation, ion-exchange, or impregnation. The latter constitutes a preferred method of preparation, and utilizes water-soluble compounds, where available. Suitable water-soluble compounds include nickel nitrate hexahydrate, nickel acetate, nickel ammonium chloride, nickel bromide, nickel chloride, etc. Following the incorporation of the metallic components, the carrier material is dried at a temperature of about 200° F. to about 400° F., and thereafter subjected to a calcination, or oxidation technique at an elevated temperature of about 800° F. to about 1,150° F. When the carrier material constitutes a crystalline aluminosilicate, the preferred maximum temperature for calcination is about 1,000° F.

With respect to the metal components selected from the group consisting of the metals from Groups I, II and V of the Periodic Table, they may likewise be incorporated into the carrier material in any suitable manner, including coprecipitation or cogellation, ion-exchange, or impregnation. As with the nickel component, the latter constitutes a preferred method of preparation, utilizing water-soluble compounds, where available, or alcohol solutions, or other organic solutions of the metallic components. Suitable water-soluble compounds include beryllium acetate, magnesium ammonium chloride, lithium benzoate, lithium chloride, lithium fluoride, sodium acetate, calcium bromide, calcium chloride, calcium nitrate, vanadium chloride, niobium chloride, tantalum chloride, strontium acetate, magnesium acetate, beryllium ammonium chloride, potassium carbonate, lithium hydroxide, lithium formate, sodium carbonate, sodium halide (preferably sodium chloride and/or sodium fluoride), potassium formate, potassium nitrate, barium acetate, barium phosphate, lithium citrate, sodium chlorate, magnesium chloride, magnesium benzoate, beryllium benzoate, strontium chloride, strontium nitrate, sodium benzoate, lithium nitrate, potassium acetate, potassium hydroxide, barium bromide chloride, vanadyl acetylacetonate, barium hydroxide, etc. Where possible, a preferred technique utilizes a single impregnating solution by which all the intended metal components are simultaneously incorporated within the carrier material.

Prior to its use, the catalytic composite may be subjected to a substantially water-free reduction technique. This is designed to insure a more uniform and finely divided dispersion to the various metallic components throughout the carrier material. Substantially pure and dry hydrogen (less than about 30.0 vol. p.p.m. of water) is employed as the reducing agent. The catalyst is contacted at a temperature of about 800° F. to about 1,150° F., and for a period of time from 0.5 to about 10 hours, to substantially reduce the metallic components.

The hydrocracking process is often improved when the reduced composite is subjected to a presulfiding technique designed to incorporate from about 0.05 percent to about 0.50 percent by weight of sulfur on an elemental basis. This presulfiding treatment takes place in the presence of hydrogen and a suitable sulfur-containing compound including hydrogen sulfide, carbon disulfide, lower molecular weight mercaptans, organic sulfides, etc. This technique involves treating the reduced catalyst with a sulfiding gas, such as a mixture of hydrogen and hydrogen sulfide containing about 10 moles of hydrogen per mole of hydrogen sulfide, and at conditions sufficient to effect the desired degree of incorporation of sulfur. These conditions include a temperature ranging from about 50° F. to about 1,100° F. It is considered to be good practice to perform the presulfiding technique under substantially water-free conditions.

In accordance with the present invention, the hydrocarbon feed stock and hydrogen are contacted with a catalyst of the type hereinabove described, in a hydrocarbon conversion zone. The particular catalyst employed is primarily dependent upon the characteristics of the charge stock as well as the desired end result. The contacting may be accomplished by using the catalyst in a fixed-bed system, a moving-bed system, a fluidized-type bed system, or in a batch-type operation; however, in view of the risk of attrition losses, it is preferred to use the fixed-bed system. With exceptionally heavy charge stocks containing nondistillable asphaltics, a preferred technique involves the use of a fluidized-bed system. In the fixed-bed system, a hydrogen-rich gas and the charge stock are preheated by any suitable heating means to the desired reaction temperature, and are then passed into the conversion zone containing the fixed-bed of the catalytic composite. It is understood, of course, that the conversion zone may be one or more separate reactors having suitable means therebetween to insure that the desired conversion temperature is maintained at the entrance to each reactor. The reactants may be contacted by the catalyst in either upward, downward, or radial flow fashion, with the latter being preferred. Additionally, the reactants may be in the liquid phase, a mixed liquid-vapor phase, or a vapor phase when contacting the catalyst. In view of the fact that the reactions being effected are exothermic in nature, an increasing temperature gradient is experienced as the hydrogen and feed stock traverse the catalyst bed. In accordance with the present process, the maximum catalyst bed temperature, considered to be virtually the same as that at the outlet of the reaction zone, is in the range of from about 600° F. to about 900° F. In any given process, in order to assure that the catalyst bed temperature does not exceed the maximum allowable, conventional quench streams, either normally liquid, or normally gaseous, may be introduced at one or more intermediate loci of the catalyst bed. When hydrocracking to produce lower-boiling hydrocarbon products, that portion of the normally liquid product effluent boiling above the end boiling point of the desired product is recycled to combine with the fresh hydrocarbon charge stock. In these situations, the combined liquid feed ratio, defined as volumes of total liquid charge to the reaction zone per volume of fresh feed charge to the reaction zone, will be within the range of from about 1.1 to about 6.0. With respect to controlling the maximum catalyst bed temperature, good practice dictates that the increasing temperature gradient be limited to a maximum of about 100° F.

EXAMPLES

In presenting these examples, it is not intended that my invention be limited to a specific illustration, nor is it intended that the hydrocracking process be limited to the specific operating conditions, processing techniques, catalytic composites and other individual process details. It is understood, therefore, that the present invention is merely illustrated by the specifies hereinafter set forth.

EXAMPLE I

A specific illustration of the process encompassed by my invention involves the use of a catalytic composite of about 4.5 percent by weight of nickel and 0.75 percent by weight of beryllium, which have been impregnated onto a faujasitic crystalline aluminosilicate carrier material, of which about 91.6 percent by weight constitutes zeolitic material. The catalyst is intended for utilization in hydrocracking 20,000 Bbl./day of a heavy vacuum gas oil having a gravity of about 20.6° API. Other properties of this charge stock include an initial boiling point of 750° F., a 50.0 percent volumetric distillation temperature of 830° F., an end boiling point of about 992° F.; the feed stock contains 1,600 p.p.m. by weight of nitrogen and 1.85 percent by weight of sulfur. The intended object is to produce a varied product slate of (1) maximum quantities of a heptane—356° F. end point gasoline fraction, (2) maximum quantities of a pentane/hexane concentrate for motor fuel-blending purposes and (3) a butane concentrate comprising at least about 65.0 percent by volume of iso-butanes. It is intended that this object be accomplished with not more than 10.0 percent by weight of the feed being converted into light, normally gaseous hydrocarbons, including propane, and preferably less than about 5.0 percent by weight. Thus, while an iso-butane concentrate, for subsequent conversion into isobutylene, is desired, this is not to be accompanied by an overproduction of propanes which, when combined with a butane concentrate constitutes LPG.

In view of the relatively large quantities of sulfurous and nitrogenous compounds, the vacuum gas oil charge stock is initially subjected to a clean-up operation in the presence of about 10,000 scf./Bbl. of hydrogen, and in contact with a catalytic composite of about 1.8 percent by weight of nickel and 16.0 percent by weight of molybdenum, combined with an amorphous carrier material consisting of about 63.0 percent by weight of alumina and 37.0 percent by weight of silica. Other operating conditions include a pressure of about 2,350 p.s.i.g., an LHSV of 0.85 and a maximum catalyst bed temperature of 850° F., representing an increasing temperature gradient of about 100° F. The hydrorefining operation results in a product effluent containing less than about 1.0 p.p.m. of sulfurous compounds and about 0.1 p.p.m. of nitrogen, at a hydrogen consumption of 1,167 s.c.f./Bbl. (1.89 percent by weight based upon fresh feed).

This particular commercially designed unit is intended to function in a series-flow fashion with the total product effluent from the hydrorefining reaction zone being utilized as the charge to the hydrocracking zone. The hydrocracking reaction zone is maintained at a pressure of about 2,250 p.s.i.g., a maximum catalyst bed temperature, controlled by a hydrogen quench stream in an amount of 4,200 s.c.f./Bbl., of about 800° F., representing an increasing temperature gradient of about 80° F.; the LHSV is about 0.49. The reaction product effluent is introduced into a high-pressure separator at a temperature of about 100° F. A hydrogen-rich principally vaporous phase is withdrawn by way of compressive means and recycled to combine with the fresh feed to the hydrorefining reaction zone. The normally liquid phase, withdrawn from the high-pressure separator, is subjected to a fractionation train to recover the desired product streams. That portion of the hydrocracked product effluent boiling above a temperature of 356° F., is recycled to the inlet of the hydrocracking reaction zone in an amount to provide a combined feed ratio thereto of about 1.77.

The product yield and distribution, including an additional 1,090 s.c.f./Bbl. of hydrogen (1.77 percent by weight), consumed in the hydrocracking reaction zone, is presented in the following Table I.

TABLE I

| Product Yield and Distribution Component | Wt. % | Vol. % |
| --- | --- | --- |
| Ammonia | 0.19 | — |
| Hydrogen Sulfide | 1.97 | — |
| Methane | 0.38 | — |
| Ethane | 0.55 | — |
| Propane | 3.75 | — |
| Iso-Butane | 10.55 | 17.42 |
| N-Butane | 4.69 | 7.47 |
| Iso-Pentane | 10.08 | 15.01 |
| N-Pentane | 0.77 | 1.13 |
| Hexanes | 15.80 | 21.27 |
| Heptane—356° F. | 54.94 | 67.24 |

With respect to the butane concentrate, produced in an amount of about 4,975 Bbl./day, about 70.0 percent thereof constitutes iso-butanes. With respect to the total pentane/hexane fraction, in an amount of about 7,500 Bbl./day, the gravity is about 82.0° API, the clear research octane rating is about 83.7 and the leaded research octane rating is about 98.0. With respect to the intended heptane—356° F. gasoline fraction, the gravity is 54.6° API and an analysis indicates about 41.4 percent by volume of paraffinic hydrocarbons, 43.0 percent of naphthenic hydrocarbons and about 15.6 percent aromatics. A similar process, utilizing a catalytic composite comprising 5.0 percent by weight of a nickel component combined with 75.0 percent by weight of silica and 25.0 percent by weight of alumina, results in approximately a threefold increase in propane and a twofold increase in both methane and ethane. There exists a correspondingly significant decrease in the volumetric yield of normally liquid hydrocarbons, including the iso- and n-butane, and a "loss" of approximately 72.0 percent of the aromatics to naphthenes and paraffins.

EXAMPLE II

In this example, the charge stock is slightly lighter than that of example I, being a blend of a diesel fuel and a vacuum gas oil, having a gravity of about 25.0° API, an initial boiling point of about 547° F., a 50.0 percent volumetric distillation temperature of about 773° F. and an end boiling point of about 1,015° F. The blended charge stock contains about 1.45 percent by weight of sulfur and about 655 p.p.m. by weight of nitrogen. In this instance, the intended object is the maximum production of a 350° F. to 550° F. kerosene boiling range fraction with the remainder of the normally liquid product effluent being principally in the heptane—350° F. gasoline boiling range. The charge stock is again subjected to a hydrorefining reaction at a pressure of about 2,500 p.s.i.g., and a maximum catalyst bed temperature of about 775° F. The hydrocracking reaction zone is maintained at a pressure of about 2,400 p.s.i.g. and a maximum catalyst bed temperature of about 875° F. The hydrogen circulation rate is about 9,200 s.c.f./Bbl., and 5,200 s.c.f./Bbl. of hydrogen are utilized as a quench stream to maintain the temperature gradient increase at a level of about 100° F. The LHSV, based upon fresh feed only, is 0.50, while the combined liquid feed ratio, following a recycle of that portion of the product effluent boiling above 550° F., is about 1.3. The catalyst disposed within the hydrocracking reaction zone comprises about 4.0 percent by weight of nickel and about 1.0 percent by weight of vanadium, calculated as the elements, combined with a carrier material of about 75.0 percent by weight of silica and 25.0 percent by weight of alumina.

The total product yield and distribution, including an overall hydrogen consumption of about 2.68 percent by weight, or 1,599 s.c.f./Bbl., is presented in the following Table II.

TABLE II

| Product Yield and Distribution Component | Wt. % | Vol. % |
| --- | --- | --- |
| Ammonia | 0.08 | — |
| Hydrogen Sulfide | 1.54 | — |
| Methane | 0.60 | — |
| Ethane | 0.90 | — |
| Propane | 1.81 | — |
| Butanes | 3.49 | 5.49 |
| Pentanes | 2.85 | 4.10 |
| Hexanes | 3.44 | 4.50 |
| Heptane—350° F. | 23.68 | 28.34 |
| 350°–550° F. | 64.27 | 71.28 |

With respect to the pentane/hexane concentrate, the gravity is about 83.7° API, the clear research octane rating is about 77.0 and the leaded research octane rating is about 95.0. Analysis indicates that the heptane—350° F. gasoline boiling range fraction, having a gravity of about 55.8° API, contains about 16.8 percent by weight of aromatics, 50.0 percent by volume of naphthenes and about 33.2 percent by volume of paraffins. With respect to Table II, it should be noted that the intended object was successfully accomplished with only 3.31 percent by weight of light paraffinic hydrocarbons as a "yield loss." Furthermore, the total volumetric yield of normally liquid hydrocarbons, including the butane stream, amounts to about 114.28 percent by volume.

The foregoing specification and particularly the examples, clearly illustrate the method by which the present invention is effected and the benefits to be afforded through the utilization thereof.

I claim as my invention:

1. A process for converting a hydrocarbon charge stock into lower boiling normally liquid hydrocarbon products while minimizing production of light petroleum gas product which comprises reacting said charge stock and hydrogen at hydrocracking conditions in a hydrocracking reaction zone and in contact therein with a nonplatinum-containing catalytic composite of a porous carrier material selected from the group consisting of amorphous refractory inorganic oxides and zeolitic crystalline aluminosilicate, a nickel component and a metallic component selected from the group consisting of lithium, sodium, potassium, rubidium, beryllium, magnesium, calcium, strontium, barium, vanadium, niobium and tantalum.

2. The process of claim 1 further characterized in that said hydrocracking conditions include a maximum catalyst temperature of from 600° F. to about 900° F., a pressure of from 1,000 to about 5,000 p.s.i.g., a hydrogen concentration of from 2,000 to about 50,000 s.c.f./Bbl. and an LHSV of from about 0.25 to about 10.0.

3. The process of claim 1 further characterized in that said porous carrier material is an amorphous composite of alumina and silica.

4. The process of claim 1 further characterized in that said carrier material is faujasite.

5. The process of claim 1 further characterized in that said catalytic composite comprises a porous carrier material, a nickel component and from 0.01 percent to about 2.0 percent by weight of at least one metallic component.

* * * * *